US009349283B2

(12) United States Patent
Yoshida et al.

(10) Patent No.: US 9,349,283 B2
(45) Date of Patent: May 24, 2016

(54) REMOTE OPERATION SYSTEM AND REMOTE CONTROLLER

(71) Applicant: Panasonic Intellectual Property Management Co., Ltd., Osaka (JP)

(72) Inventors: Junji Yoshida, Osaka (JP); Tetsuya Sato, Kanagawa (JP); Kouichi Matsumura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/862,417

(22) Filed: Sep. 23, 2015

(65) Prior Publication Data

US 2016/0012718 A1 Jan. 14, 2016

Related U.S. Application Data

(60) Division of application No. 13/553,601, filed on Jul. 19, 2012, which is a continuation of application No. PCT/JP2012/000372, filed on Jan. 23, 2012.

(30) Foreign Application Priority Data

Mar. 29, 2011 (JP) ................................ 2011-072680

(51) Int. Cl.
*G05B 11/01* (2006.01)
*G08C 17/02* (2006.01)

(52) U.S. Cl.
CPC ............ *G08C 17/02* (2013.01); *G08C 2201/30* (2013.01); *G08C 2201/71* (2013.01)

(58) Field of Classification Search
None
See application file for complete search history.

(56) References Cited

U.S. PATENT DOCUMENTS

| | | | | |
|---|---|---|---|---|
| 6,791,467 | B1 * | 9/2004 | Ben-Ze'ev | G08C 19/28 340/12.25 |
| 2001/0018329 | A1 | 8/2001 | Tada et al. | |
| 2003/0048770 | A1 * | 3/2003 | Proctor, Jr. | H01Q 3/2605 370/349 |

(Continued)

FOREIGN PATENT DOCUMENTS

| | | | |
|---|---|---|---|
| JP | 10-271573 | A | 10/1998 |
| JP | 2001-184149 | A | 7/2001 |

(Continued)

OTHER PUBLICATIONS

Co-pending U.S. Appl. No. 13/553,601, filed Jul. 19, 2012 (application provided).

(Continued)

*Primary Examiner* — Ojiako Nwugo
(74) *Attorney, Agent, or Firm* — Renner, Otto, Boisselle & Sklar, LLP

(57) ABSTRACT

In one aspect, when a user directs a remote controller (13) toward a television set (11), causing the remote controller (13) and the television set (11) to enter the wireless communication region of each other, the remote controller (13) and the television set (11) establish a wireless link to each other. When the user directs the remote controller (13) toward an air conditioner (12), causing the remote controller (13) and the air conditioner (12) to enter the wireless communication region of each other, the remote controller (13) and the air conditioner (12) establish a wireless link to each other. The remote controller (13) and the television set (11) are out of the wireless communication region of each other at this point, and the wireless link between the two is thus disconnected.

10 Claims, 9 Drawing Sheets

(56) References Cited

U.S. PATENT DOCUMENTS

| | | | | |
|---|---|---|---|---|
| 2006/0065709 | A1 | 3/2006 | Yamashita | |
| 2006/0085579 | A1 | 4/2006 | Sato | |
| 2006/0270458 | A1 | 11/2006 | Watanabe | |
| 2011/0212699 | A1 * | 9/2011 | Howard | H04M 1/7253 455/404.1 |
| 2011/0212702 | A1 * | 9/2011 | Howard | H04L 12/6418 455/404.2 |
| 2012/0001738 | A1 * | 1/2012 | Hilgers | G08C 17/02 340/12.5 |
| 2012/0007772 | A1 * | 1/2012 | Parssinen | G06F 3/013 342/176 |
| 2013/0108275 | A1 * | 5/2013 | Knutson | H04N 5/4403 398/107 |

FOREIGN PATENT DOCUMENTS

| | | | |
|---|---|---|---|
| JP | 2001-258082 | A | 9/2001 |
| JP | 2001-268668 | A | 9/2001 |
| JP | 2002-199475 | A | 7/2002 |
| JP | 2002-330483 | A | 11/2002 |
| JP | 2003-018306 | A | 1/2003 |
| JP | 2004-274102 | A | 9/2004 |
| JP | 2006-014148 | A | 1/2006 |
| JP | 2006-115196 | A | 4/2006 |
| JP | 2006-325046 | A | 11/2006 |
| JP | 2007-142806 | A | 6/2007 |
| JP | 2007-274173 | A | 10/2007 |
| JP | 2008-042432 | A | 2/2008 |

OTHER PUBLICATIONS

International Search Report for related International Application No. PCT/JP2012/000372 mailed Feb. 14, 2012.

Form PCT/ISA/237 for International Application No. PCT/JP2012/000372 dated Feb. 14, 2012 and partial English translation.

Beetle, [online], [retrieved on Mar. 9, 2011], InternetURL:http://www.bee-u.com/app/beetle (cited in [0006] of specification).

Notice of Reasons for Rejection issued on Oct. 28, 2014 for corresponding Japanese Application No. 2012-523145.

* cited by examiner

REMOTE OPERATION SYSTEM AND REMOTE CONTROLLER

This is a continuation of International Application No. PCT/JP2012/000372, with an international filing date of Jan. 23, 2012, which claims priority of Japanese Patent Application No. 2011-072680, filed on Mar. 29, 2011, the contents of which are hereby incorporated by reference.

BACKGROUND

1. Technical Field

The present disclosure relates to a remote operation system that uses a remote controller to remotely operate a television set or a similar appliance, and a remote controller for use in such a remote operation system.

2. Description of the Related Art

Today, various appliances from AV equipment such as television sets and digital versatile disc (DVD) players to air conditioners and lighting fixtures can be operated remotely by a remote controller. Infrared communication is generally used for communication between a remote controller and a household appliance operated by the remote controller.

Remote controllers that use infrared communication can be implemented at low cost but are marked by slow transmission rate. For that reason, it is common to limit the use of an infrared remote controller to the transmission of simple instructions such as “power on/off” and “start play” to an appliance.

Usually, only one type of appliance can be operated by one remote controller. Some remote controllers, however, have operation buttons for a television set and operation buttons for a DVD player, and can operate the television set and the DVD player.

Remote controllers that use, instead of infrared communication, high-transmission rate wireless communication such as wireless local area network (LAN) and Bluetooth (trademark) are lately being put into practice. This type is not limited to a dedicated remote controller and can be a general-purpose terminal such as a smartphone used as a remote controller. For example, Non-patent Document No. 1 (Beetle, [online], [retrieved on Mar. 9, 2011], Internet <URL: http://www.bee-u.com/app/beetle>) discloses a technology in which a dedicated application is installed in a smartphone to operate a recorder.

With those technologies, a user can use a general-purpose terminal as a remote controller capable of operating a plurality of appliances by switching applications for appliances to be operated.

Patent Document No. 1 (Japanese Patent Application Laid-Open Publication No. 2002-199475) discloses a technology for downloading remote operation data from a television set or a similar appliance by wireless communication such as Bluetooth. Bluetooth is non-directional wireless communication, which allows an appliance and a remote controller to hold wireless communication irrespective of their directions. If remote operation data is downloaded and an operating application is installed in a remote controller in advance, a user only needs to select an appliance to be operated on a screen of the remote controller in order to use this remote controller as a remote controller capable of operating the appliance chosen by the user.

SUMMARY

When non-directional wireless communication such as wireless LAN or Bluetooth is used, a plurality of appliances often exist within the same room or the wireless communication region of a remote controller. In such a situation, the remote controller of Patent Document No. 1 (Japanese Patent Application Laid-Open Publication No. 2002-199475) can hold wireless communication to/from all of the appliances and the user is therefore required each time to manually select an appliance to be operated from a list of appliances within the communication region which is displayed on the screen of the remote controller. This is particularly problematic when a plurality of appliances of the same kind exist within the communication region, which makes it difficult for a user to identify which one is the appliance that the user wishes to operate.

The present disclosure provides a remote controller that allows a user to select an appliance to be operated and operate the selected appliance by the remote controller simply by directing the remote controller toward the appliance, and a remote operation system that uses such a remote controller.

According to one aspect of the present invention, there is provided a remote operation system for remotely operating an appliance to be controlled by a controller through use of wireless communication capable of interactive communication and having directivity, the controller including a directional antenna for transmitting/receiving directional wireless signals, in which, when the controller is changed in direction in a manner that causes the appliance to be controlled to enter a region of wireless communication to/from the controller, the remote operation system executes the following operations:

(a-i) the controller and the appliance to be controlled establish a wireless link to each other;

(a-ii) the appliance to be controlled transmits, by the wireless communication, to the controller, data for remotely operating the appliance to be controlled by the controller; and (a-iii) based on the data received from the appliance to be controlled, the controller sets a user interface for remotely operating the appliance to be controlled.

In an embodiment, when the controller is operated by a user, the remote operation system executes the following operations:

(b-i) the controller transmits, by the wireless communication, to the appliance to be controlled, a command that indicates an instruction input by the user; and (b-ii) the appliance to be controlled executes an operation based on the received command.

In an embodiment, when the controller is changed in direction in a manner that causes the appliance to be controlled to exit the region of wireless communication to/from the controller, the wireless link is disconnected automatically.

In an embodiment, when the controller is changed in direction in a manner that causes another appliance to be controlled, which is different from the appliance to be controlled from which the wireless link has been disconnected, to enter the region of wireless communication to/from the controller, the operations (a-i) to (a-iii) are executed between the controller and the another appliance to be controlled.

In an embodiment, the controller further includes a display section, and based on the data received from the appliance to be controlled, the controller builds a user interface screen on the display section.

In an embodiment, the data is application software for operating the appliance to be controlled, and the controller builds the user interface screen on the display section by executing the application software for operating the appliance to be controlled.

In an embodiment, the controller includes, in advance, a piece of user interface screen information in association with each type of appliance to be controlled, the data is identification information for discriminating one appliance to be controlled from another appliance to be controlled, and the controller builds on the display section the user interface screen associated with the appliance to be controlled that has been identified from the identification information.

According to one aspect of the present invention, there is provided a controller for remotely operating an appliance to be controlled by a controller through use of wireless communication capable of interactive communication and having directivity, the controller including a directional antenna for transmitting/receiving directional wireless signals, in which, when the controller is changed in direction in a manner that causes the appliance to be controlled to enter a region of communication to/from the controller, the controller is configured to execute the following operations of:

(a-i) establishing a wireless link to/from the appliance to be controlled;

(a-ii) receiving, by the wireless communication, from the appliance to be controlled, data for remotely operating the appliance to be controlled; and (a-iii) based on the data received from the appliance to be controlled, setting a user interface for remotely operating the appliance to be controlled.

According to one aspect of the present invention, there is provided a program for causing a controller to execute remote operation with respect to an appliance to be controlled, which uses wireless communication capable of interactive communication and having directivity, the controller including a directional antenna for transmitting/receiving directional wireless signals, in which, when the controller is changed in direction in a manner that causes the appliance to be controlled to enter a region of wireless communication to/from the controller, the program controlling the controller to execute the steps of:

(a-i) establishing a wireless link to/from the appliance to be controlled;

(a-ii) receiving, by the wireless communication, from the appliance to be controlled, data for remotely operating the appliance to be controlled; and (a-iii) based on the data received from the appliance to be controlled, setting a user interface for remotely operating the appliance to be controlled.

According to one aspect of the present invention, there is provided a remote operation system for remotely operating an appliance to be controlled by a controller through use of wireless communication capable of interactive communication and having directivity, the controller including: a plurality of directional antennas which are directional in directions different from one another; an antenna switching section for switching among the plurality of directional antennas to be used; and a lock section for selecting between a locked state and an unlocked state of the controller, in which the remote operation system executes the following operations:

(c-i) when the controller is in the unlocked state, the antenna switching section selects a specific directional antenna from among the plurality of directional antennas;

(c-ii) when the controller is changed in direction in a manner that causes the appliance to be controlled to enter a region of wireless communication which uses the specific directional antenna, the lock section switches the controller from the unlocked state to the locked state, and the controller and the appliance to be controlled establish a wireless link to each other;

(c-iii) during the locked state, the antenna switching section sequentially switches among the plurality of directional antennas to be used, as the appliance to be controlled to/from which the wireless link has been established exits a wireless communication region of one directional antenna and enters a wireless communication region of another directional antenna;

(c-iv) the appliance to be controlled transmits, by the wireless communication, to the controller, data for remotely operating the appliance to be controlled by the controller;

(c-v) based on the data received from the appliance to be controlled, the controller sets a user interface for remotely operating the appliance to be controlled; and (c-vi) when switched from the locked state to the unlocked state, the controller disconnects the established wireless link.

In an embodiment, when the controller is operated by a user, the remote operation system executes the following operations:

(d-i) the controller transmits, by the wireless communication, to the appliance to be controlled, a command that indicates an instruction input by the user; and (d-ii) the appliance to be controlled executes an operation based on the received command.

In an embodiment, when the controller is changed in direction in a manner that causes the appliance to be controlled to exit regions of wireless communication to/from all of the plurality of directional antennas, the wireless link is disconnected automatically.

In an embodiment, during the unlocked state, when the controller is changed in direction in a manner that causes another appliance to be controlled, which is different from the appliance to be controlled from which the wireless link has been disconnected, to enter the region of wireless communication which uses the specific directional antenna, the operations (c-ii) to (c-vi) are executed between the controller and the another appliance to be controlled.

In an embodiment, the controller further includes a display section, and based on the data received from the appliance to be controlled, the controller builds a user interface screen on the display section.

In an embodiment, the data is application software for operating the appliance to be controlled, and the controller builds the user interface screen on the display section by executing the application software for operating the appliance to be controlled.

In an embodiment, the controller includes, in advance, a piece of user interface screen information in association with each type of appliance to be controlled, the data is identification information for discriminating one appliance to be controlled from another appliance to be controlled, and the controller builds on the display section the user interface screen associated with the appliance to be controlled that has been identified from the identification information.

In an embodiment, the remote operation system includes a directional antenna that is capable of changing an electric wave transmission direction, instead of the plurality of directional antennas and the antenna switching section, in which, when the controller is in the unlocked state, the electric wave transmission direction of the directional antenna is fixed, and when the controller is in the locked state, the directional antenna changes the electric wave transmission direction as needed in a manner that causes the appliance to be controlled to/from which the wireless link has been established to enter a wireless communication region.

According to one aspect of the present invention, there is provided a controller for remotely operating an appliance to be controlled by a controller through use of wireless communication capable of interactive communication and having directivity, the controller including: a plurality of directional antennas which are directional in directions different from one another; an antenna switching section for switching among the plurality of directional antennas to be used; and a lock section for selecting between a locked state and an unlocked state of the controller, in which the controller is configured to execute the following operations of:

(c-i) selecting, by the antenna switching section, when the controller is in the unlocked state, a specific directional antenna from among the plurality of directional antennas;

(c-ii) switching, by the lock section, when the controller is changed in direction in a manner that causes the appliance to be controlled to enter a region of wireless communication which uses the specific directional antenna, the controller from the unlocked state to the locked state, and establishing a wireless link between the controller and the appliance to be controlled;

(c-iii) sequentially switching, by the antenna switching section, during the locked state, among the plurality of directional antennas to be used, as the appliance to be controlled to/from which the wireless link has been established exits a wireless communication region of one directional antenna and enters a wireless communication region of another directional antenna;

(c-iv) receiving, by the wireless communication, from the appliance to be controlled, data for remotely operating the appliance to be controlled;

(c-v) setting, based on the data received from the appliance to be controlled, a user interface for remotely operating the appliance to be controlled; and (c-vi) disconnecting, by the controller, the established wireless link when the controller is switched from the locked state to the unlocked state.

According to one aspect of the present invention, there is provided a program for causing a controller to execute remote operation with respect to an appliance to be controlled, which uses wireless communication capable of interactive communication and having directivity, the controller including a plurality of directional antennas which are directional in directions different from one another, the program controlling the controller to execute the steps of:

(c-i) when the controller is in an unlocked state, selecting a specific directional antenna from among the plurality of directional antennas;

(c-ii) when the controller is changed in direction in a manner that causes the appliance to be controlled to enter a region of wireless communication which uses the specific directional antenna, switching the controller from the unlocked state to a locked state, and establishing a wireless link between the controller and the appliance to be controlled;

(c-iii) during the locked state, sequentially switching among the plurality of directional antennas to be used, as the appliance to be controlled to/from which the wireless link has been established exits a wireless communication region of one directional antenna and enters a wireless communication region of another directional antenna;

(c-iv) receiving, by the wireless communication, from the appliance to be controlled, data for remotely operating the appliance to be controlled;

(c-v) based on the data received from the appliance to be controlled, setting a user interface for remotely operating the appliance to be controlled; and (c-vi) when the controller is switched from the locked state to the unlocked state, disconnecting the established wireless link.

According to one aspect of the present invention, there is provided an electrical appliance to be remotely operated through wireless communication capable of interactive communication and having directivity, the electrical appliance including a directional antenna for transmitting/receiving directional wireless signals, in which, when the controller is changed in direction in a manner that causes the electrical appliance to enter a region of wireless communication to/from the controller, the electrical appliance executes the following operations:

(a-i) the electrical appliance establishes a wireless link to/from the controller;

(a-ii) the electrical appliance transmits, by the wireless communication, to the controller, data for remotely operating the electrical appliance by the controller; and (a-iii) the electrical appliance receives, from the controller, a command indicating an instruction of a user and executes an operation based on the command.

In an embodiment, the electrical appliance further includes an alert section for informing the user of a fact that the wireless link has been established, in which, when the wireless link is established, the alert section outputs at least one of light and sound to alert the user to the establishment of the wireless link.

According to one aspect of the present invention, the remote controller includes the directional antenna for transmitting/receiving directional wireless signals, and the remote controller and the appliance to be controlled establish the wireless link to each other when the appliance to be controlled enters the region of wireless communication to/from the remote controller as a result of changing the direction of the remote controller. The appliance to be controlled transmits, to the remote controller, by wireless communication, data that enables the remote controller to remotely operate the appliance to be controlled. Based on the data received from the appliance to be controlled, the remote controller sets the user interface for remotely operating the appliance to be controlled. It is therefore possible to allow the user to select the appliance to be operated and operate the selected appliance by the remote controller simply by directing the remote controller toward the appliance.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Remote operation systems and remote controllers according to embodiments of the present invention are described in detail below with reference to the drawings.

First Embodiment

Figure 1:
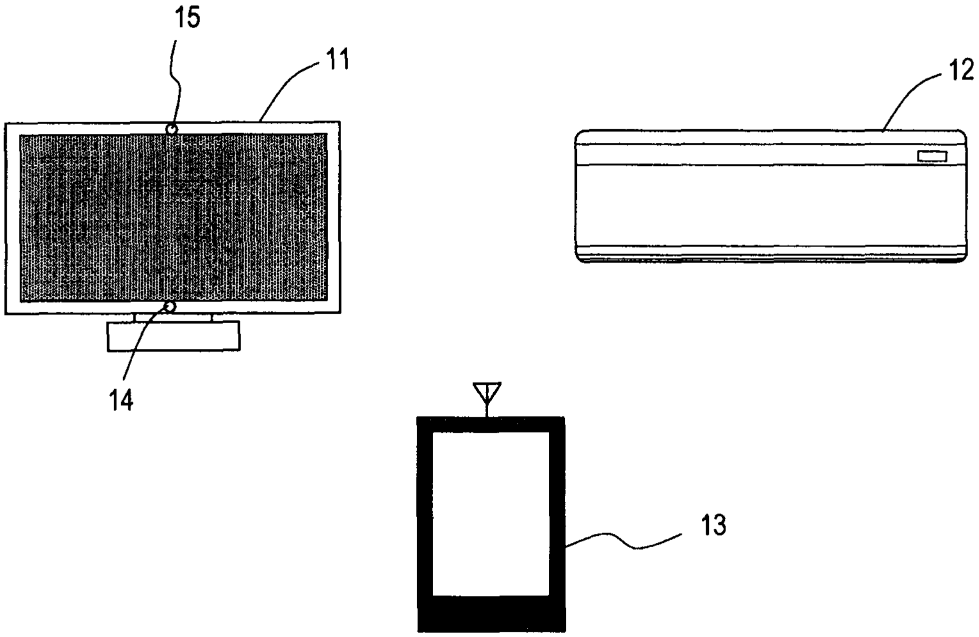
FIG. 1 is a diagram illustrating a remote operation system according to a first embodiment of the present invention.
Figure 2:
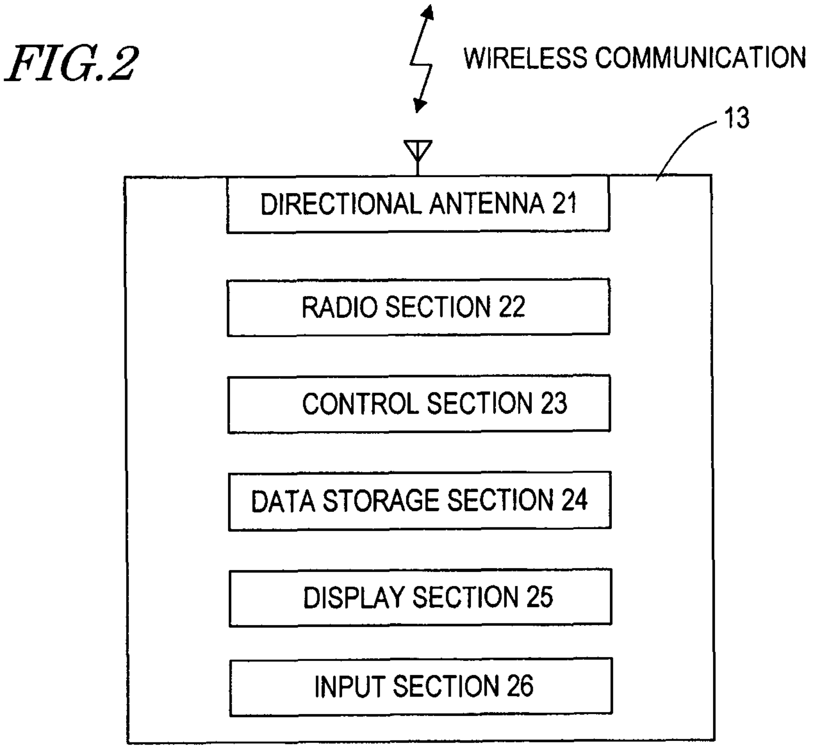
FIG. 2 is a diagram illustrating a remote controller according to the first embodiment of the present invention.
Figure 3:
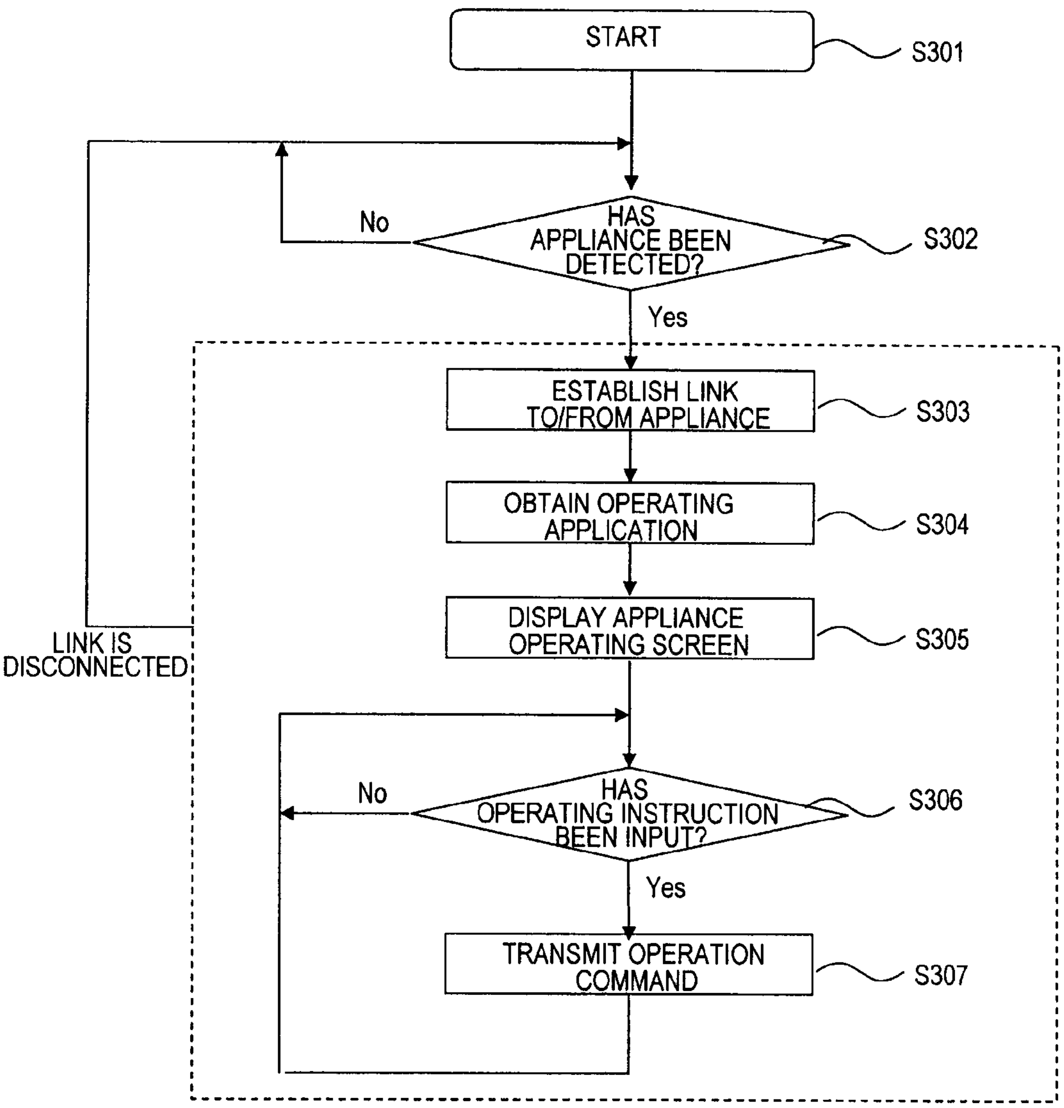
FIG. 3 is a flow chart illustrating the operation of the remote controller according to the first embodiment of the present invention.
Figure 4:
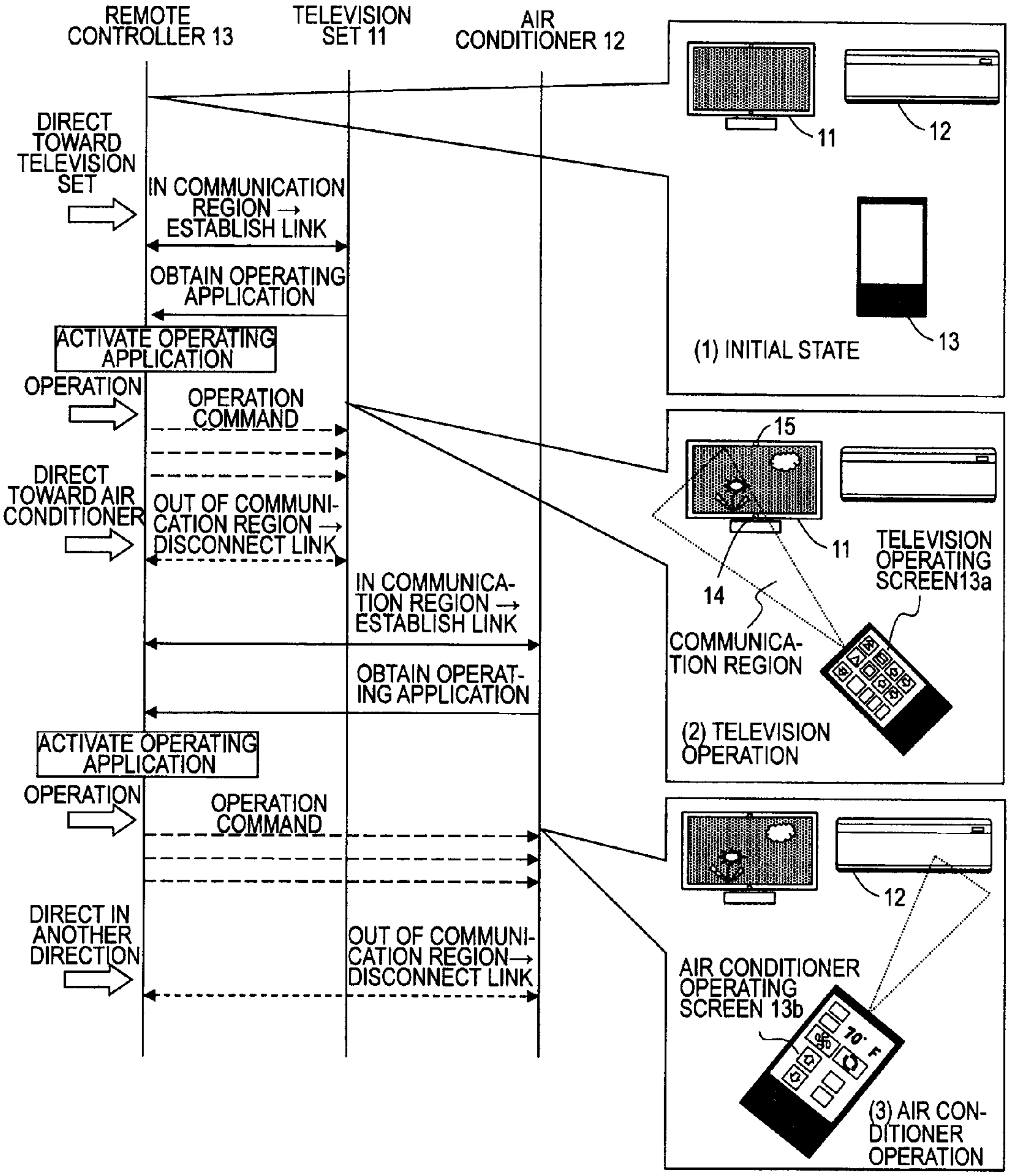
FIG. 4 is a diagram illustrating the flow of remote operation in the remote operation system according to the first embodiment of the present invention.

FIG. 1 is a diagram illustrating a remote operation system according to a first embodiment. FIG. 2 is a diagram illustrating details of a remote controller 13 of FIG. 1. FIG. 3 is a flow chart illustrating the operation of the remote controller 13. FIG. 4 is a diagram illustrating an example of remote operation in the remote operation system according to the first embodiment.

In the example of FIG. 1, the remote operation system includes a television set 11, an air conditioner 12, and the remote controller 13. The remote controller 13 holds interactive communication to/from the television set 11 and to/from the air conditioner 12. Although the television set 11 and the air conditioner 12 are given here as an example of appliances to be controlled operated by the remote controller 13, the present invention is not limited thereto. Examples of appliances to be controlled include appliances that can be operated remotely by a remote controller, such as video recording devices, video players, audio equipment, lighting fixtures, and various other household appliances. The remote controller 13 functions as a controller for remotely operating an appliance to be controlled.

<Configuration and Operation of the Remote Controller 13>

The configuration of the remote controller 13 is described first with reference to FIG. 2.

A radio section 22 transmits/receives wireless signals with the use of a directional antenna 21, to thereby hold wireless communication to/from the television set 11 and the air conditioner 12. The wireless communication uses so-called directional wireless communication in which the electric wave transmission direction is limited to a fixed region. The directional wireless communication used in this example is WiGig. Whereas Bluetooth described above is non-directional wireless communication, WiGig electric waves and other electric waves in the 60 GHz band are highly directional. The remote controller 13 can therefore be used for, for example, wireless communication to/from only an appliance toward which the remote controller 13 is directed.

The radio section 22 establishes/disconnects a wireless link to/from the television set 11 or the air conditioner 12, obtains an operating application from the television set 11 or the air conditioner 12, and transmits an operation command to the television set 11 or the air conditioner 12.

A data storage section 24 saves an operating application received from the television set 11 or the air conditioner 12.

A display section 25 is, for example, a liquid crystal display or an organic EL display, and displays a user interface screen for operating the television set 11 or the air conditioner 12. The user interface screen is generated by executing an operating application that has been received from the appliance in question.

An input section 26 is, for example, a touch panel disposed on a display surface of the display section 25 and is operated by a user to receive an input (e.g., the specification of a channel of the television set 11) that is made via a user interface screen displayed on the display section 25.

A control section 23 saves an operating application received by the radio section 22 in the data storage section 24 and executes the operating application. By executing the operating application, the control section 23 generates a user interface screen and displays the user interface screen on the display screen 25. The control section 23 also determines the specifics of an operation based on an input from the user which is received by the input section 26 and the generated user interface screen, and transmits to the radio section 22 an operation command which indicates the specifics of the operation.

A more detailed description is given next with reference to FIG. 3 of the operation of the remote controller 13. The operation of the remote controller 13 is executed by the control section 23 by controlling the operation of the respective components.

For example, the remote controller 13 starts operating when the user takes the remote controller 13 in his/her hand (Step S301). In Step S302, whether or not an appliance to be controlled (e.g., the television set 11 or the air conditioner 12) exists in the wireless communication region is checked. When there is no appliance to be controlled in the region of wireless communication to/from the remote controller 13 and then the user changes the direction of the remote controller 13, causing an appliance to be controlled to enter the wireless communication region, the remote controller 13 detects the appliance to be controlled and proceeds to Step S303. In the case where no appliance to be controlled is detected, the operation of Step S302 is repeated until detection is made. Here, the television set is detected, in which case the following operation is executed.

When detecting the television set 11, the remote controller 13 establishes a wireless link to/from the television set 11 (appliance to be operated) (Step S303), and obtains in Step S304 an operating application from the television set 11 via wireless communication.

In Step S305, the remote controller 13 executes the operating application and displays a user interface screen for operation on the display section.

In Step S306, the user inputs through the user interface screen an appliance operating instruction such as the specification of a channel or a volume adjustment. In Step S307, the remote controller 13 transmits to the television set 11 (appliance to be operated) an operation command that reflects the specifics of the input appliance operating instruction.

After transmitting the operation command, the remote controller 13 returns to Step S306 and stands by until an input from the user is received.

In the case where the remote controller 13 moves out of the mutual communication region while the wireless link to/from the television set 11 is established, the remote controller 13 automatically disconnects the wireless link and returns to Step S302.

<Operation of the Remote Operation System>

An example of the operation flow of the remote operation system illustrated in FIG. 1 is described with reference to FIG. 4.

The television set 11 includes a directional antenna for transmitting/receiving directional wireless signals. When the user directs the remote controller 13 toward the television set 11 (more specifically, when the user directs the directional antenna 21 toward the television set 11), the remote controller 13 and the television set 11 enter the wireless communication region of each other and establish a wireless link between the remote controller 13 and the television set 11.

The television set 11 also includes an alert section 15 which informs the user of the fact that a wireless link has been established. When a wireless link is established, the alert section 15 alerts the user by outputting at least one of light and sound. The user can thus recognize the fact of the establishment of a wireless link. The alert section 15 may be a built-in speaker of the television set 11. A message or the like for alerting to the establishment of a wireless link may also be displayed in a part of the television screen.

The remote controller 13 next obtains an operating application for remotely operating the television set 11 from the television set 11, and activates the operating application. This generates a user interface for remotely operating the television set 11 (a television operating screen 13*a*) on the remote controller 13 and enables the user to remotely operate the television set 11. When the user inputs an appliance operating instruction such as the specification of a channel or a volume adjustment, the remote controller 13 transmits an operation command that reflects the specifics of the operating instruction to the television set 11. The television set 11 executes an operation dictated by the operation command.

The user next directs the remote controller 13 toward the air conditioner 12, causing the remote controller and the television set 11 to exit the wireless communication region of each other. Then, the remote controller 13 automatically disconnects the wireless link to/from the television set 11. The re-directing also causes the remote controller 13 and the air conditioner 12 to enter the wireless communication region of each other, and a wireless link is established between the remote controller 13 and the air conditioner 12.

The remote controller 13 obtains an operating application for remotely operating the air conditioner 12 from the air conditioner 12, and activates the operating application. This generates a user interface for remotely operating the air conditioner 12 (an air conditioner operating screen 13*b*) on the remote controller 13 and enables the user to remotely operate the air conditioner 12 by the remote controller 13. When the user inputs an appliance operating instruction such as a temperature adjustment or an air flow adjustment, the remote controller 13 transmits an operation command that reflects the specifics of the operating instruction to the air conditioner 12. The air conditioner 12 executes an operation dictated by the operation command.

When the user directs the remote controller 13 in another direction, causing the remote controller 13 and the air conditioner 12 to move out of the wireless communication region of each other, the remote controller 13 automatically disconnects the wireless link to/from the air conditioner 12.

With the remote controller 13 operating as described above, the user can select an appliance to be operated simply by directing the remote controller 13 toward the appliance, and can use the remote controller 13 as a remote controller for remotely operating the appliance.

Figure 5:
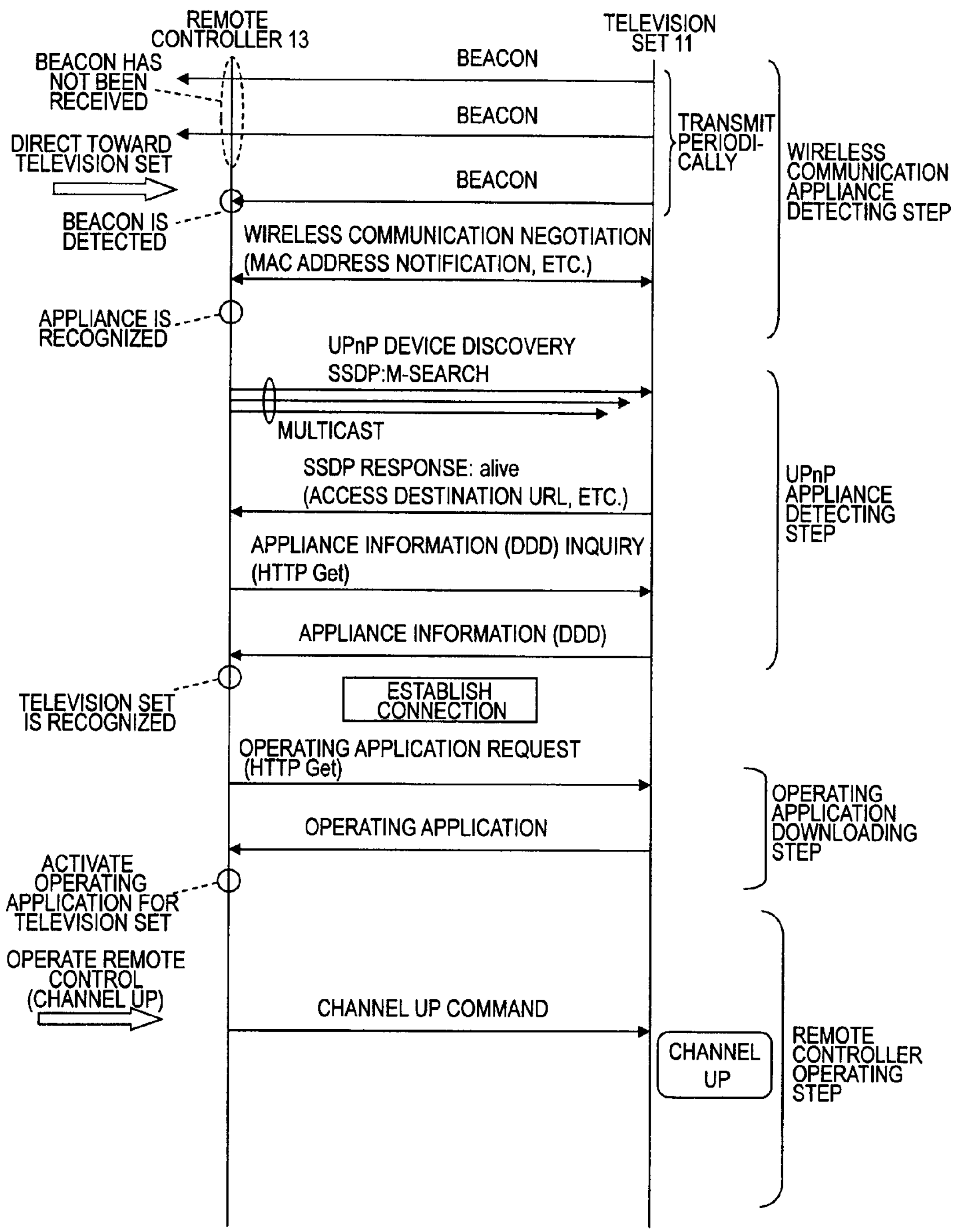
FIG. 5 is a diagram illustrating the flow of remote operation in the remote operation system according to the first embodiment of the present invention.

An example of the operation flow for establishing a wireless link is further described with reference to FIG. 5. The antenna 14 of the television set 11 periodically transmits a beacon signal. When the user directs the remote controller 13 toward the television set 11, causing the remote controller 13 and the television set 11 to enter the wireless communication region of each other, the remote controller 13 detects the beacon signal. When detecting the beacon signal, the remote controller 13 notifies unique information of the remote controller 13 to the television set 11, which in turn notifies unique information of the television set 11 to the remote controller 13. Unique information is, for example, a media access control address (MAC address).

The remote controller 13 next checks whether the television set 11 is an appliance that can be controlled by the remote controller 13 (M-SEARCH). When the television set is an appliance that can be controlled by the remote controller 13, the remote controller 13 inquires and obtains appliance information of the television set 11 to recognize the party to/from which the remote controller 13 is communicating as the television set 11. This establishes a wireless link.

The remote controller 13 next requests and obtains an operating application from the television set 11. The operating application obtained by the remote controller 13 is activated to generate a user interface for remotely operating the television set 11 on the remote controller 13. When the user inputs an appliance operating instruction such as the specification of a channel or a volume adjustment, the remote controller 13 transmits an operation command that reflects the specifics of the operating instruction to the television set 11. The television set 11 executes an operation dictated by the operation command.

The remote controller 13 may be a terminal dedicated as a remote controller or may be a general-purpose mobile terminal such as a smartphone or a notebook computer. When the remote controller 13 is a general-purpose mobile terminal, the operation described above can be executed by installing in the mobile terminal a computer program that controls the mobile terminal to execute the above-mentioned remote operation for an appliance to be controlled. The computer program may be installed from a recording medium (optical disc, a semiconductor memory, or the like) having the computer program recorded thereon, or may be downloaded via the Internet or other telecommunication lines.

Figure 6:
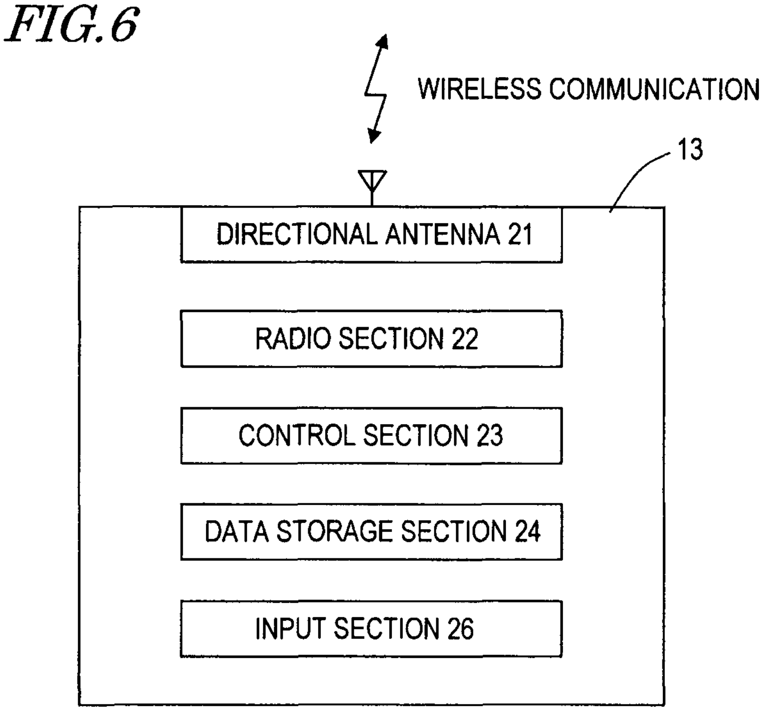
FIG. 6 is a diagram illustrating another example of the remote controller according to the first embodiment of the present invention.

The input section 26 through which the user inputs an operating instruction may be buttons or a keyboard instead of a touch panel. FIG. 6 illustrates as another example of the remote controller 13 a remote controller whose input section 26 is buttons or a keyboard. Through execution of the operating application, each of the buttons serving as the input section 26, or each key of the keyboard serving as the input section 26, is allocated an operation command (is set a user interface) for each appliance. The user presses one of the buttons or one of the keys of the keyboard, to thereby transmit an operation command that is associated with the button or the key to the relevant appliance to be controlled.

The remote controller 13, which obtains operating applications from the television set 11 and the air conditioner 12 here, may hold in advance operating applications for remotely operating the television set 11 and the air conditioner 12 and execute one of the operating applications that is associated with identification information received from the television set 11 or the air conditioner 12 as information for identifying the appliance type.

The wireless communication used in this embodiment is WiGig, but the present invention is not limited thereto and other directional wireless communication methods may be employed.

Second Embodiment

Figure 7:
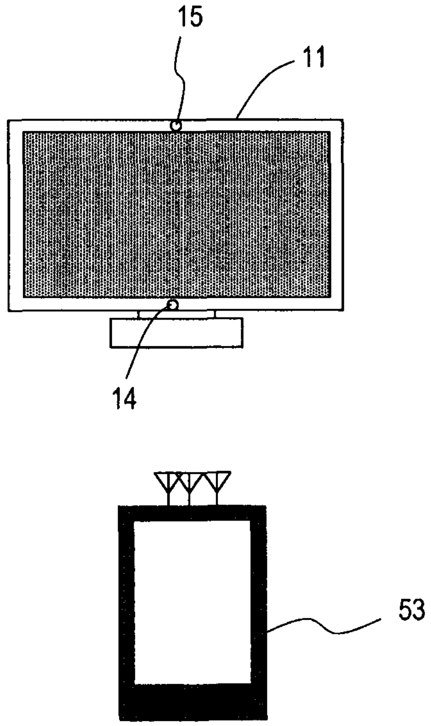
FIG. 7 is a diagram illustrating a remote operation system according to a second embodiment of the present invention.

A remote operation system according to a second embodiment which is illustrated in FIG. 7 includes the television set 11 and a remote controller 53. As in the first embodiment, appliances to be controlled in the present invention are not limited to the television set 11.

<Configuration and Operation of the Remote Controller 53>

Figure 8:
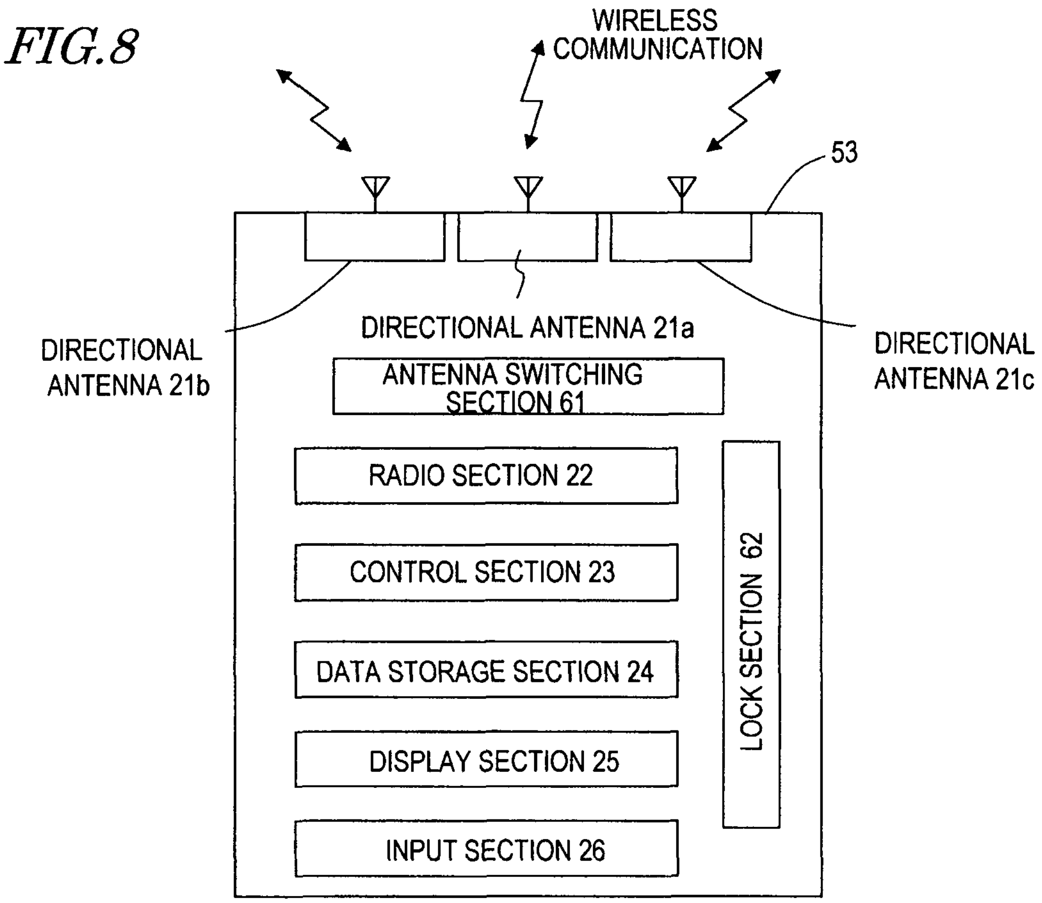
FIG. 8 is a diagram illustrating a remote controller according to the second embodiment of the present invention.

The configuration of the remote controller 53 is described first with reference to FIG. 8.

The remote controller 53 includes a plurality of directional antennas 21*a*, 21*b*, and 21*c* which are directional in directions different from one another. Compared to the remote controller 13, the remote controller 53 further includes an antenna switching section 61 for switching among the directional antennas to be used and a lock section 62 for selecting between a locked state and an unlocked state of the remote controller 53.

The directional antenna 21*a*, the directional antenna 21*b*, and the directional antenna 21*c* are arranged so that directional electric waves from the directional antennas 21*a*, 21*b*, and 21*c* are transmitted in directions different from one another. The transmission directions of the directional electric waves may differ from one another with respect to a direction parallel to the plane of the display section 25, or a direction perpendicular to the plane of the display section 25. Wireless communication used in this embodiment is directional wireless communication as in the first embodiment. The directional wireless communication used here is WiGig.

The lock section 62 switches the state of the remote controller 53 to one of the "locked state" and the "unlocked state" upon receiving settings from the user, or automatically. The "locked state" refers to an operation state in which, in order to maintain wireless communication to/from an appliance to be controlled for which a link has been established, the directional antenna used is switched sequentially as the appliance to be controlled exits the wireless communication region of one directional antenna and enters the wireless communication region of another directional antenna. The "unlocked state" refers to an operation state in which directional electric waves are transmitted from only a specific directional antenna out of the plurality of directional antennas (for example, the antenna 21*a*).

The antenna switching section 61 selects one of the directional antenna 21*a*, the directional antenna 21*b*, and the directional antenna 21*c* as the directional antenna used for wireless communication. When the remote controller 53 is in the "unlocked state", the directional antenna 21*a* is used all the time. When the remote controller 53 is in the "locked state", the directional antenna that can hold wireless communication to/from a specified appliance at the time is selected and used.

The radio section 22 communicates to/from the television set 11 by transmitting/receiving wireless signals via one of the directional antennas, which is selected by the antenna switching section 61. The radio section 22 establishes/disconnects a wireless link to/from the television set 11, obtains an operating application from the television set 11, and transmits an operation command to the television set 11.

The data storage section 24 saves an operating application received from the television set 11.

The display section 25 is, for example, a liquid crystal display or an organic EL display, and displays a user interface screen for operating the television set 11. The user interface screen is generated by executing an operating application that has been received from the appliance in question.

The input section 26 is, for example, a touch panel disposed on the display surface of the display section 25 and is operated by a user to receive an input (e.g., the specification of a channel of the television set 11) that is made via a user interface screen displayed on the display section 25.

The control section 23 saves an operating application received by the radio section 22 in the data storage section 24 and executes the operating application. By executing the operating application, the control section 23 generates a user interface screen and displays the user interface screen on the display screen 25. The control section 23 also determines the specifics of an operation based on an input from the user which is received by the input section 26 and the generated user interface screen, and transmits to the radio section 22 an operation command which indicates the specifics of the operation.

Figure 9:
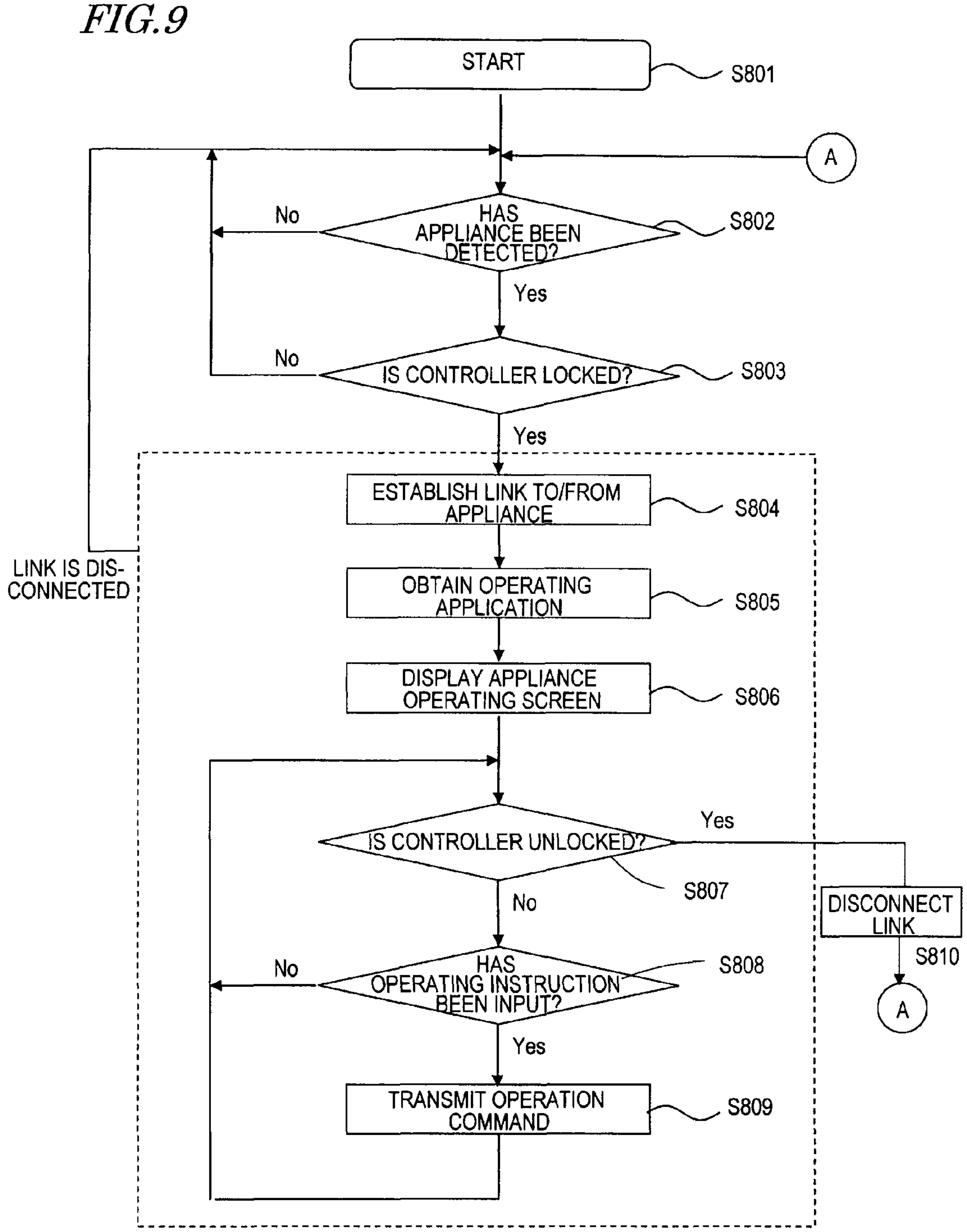
FIG. 9 is a flow chart illustrating the operation of the remote controller according to the second embodiment of the present invention.

A more detailed description is given next with reference to FIG. 9 of the operation of the remote controller 53.

For example, the remote controller 53 starts operating when the user takes the remote controller 53 in his/her hand (Step S801). The remote controller 53 in this case is in the "unlocked state".

In Step S802, whether or not an appliance to be controlled (the television set 11) exists in the wireless communication region is checked. When there is no appliance to be controlled in the region of wireless communication to/from the remote controller 53 and then the user changes the direction of the remote controller 53, causing an appliance to be controlled to enter the wireless communication region, the remote controller 53 detects the appliance to be controlled and proceeds to Step S803. In the case where no appliance to be controlled is detected, the operation of Step S802 is repeated until detection is made. Here, the television set 11 is detected, in which case the following operation is executed.

When the user locks the remote controller 53 while the television set 11 is detected, the remote controller 53 enters the "locked state" and simultaneously establishes a wireless link to/from the detected television set 11 (Steps S803 and S804). In the case where the remote controller 53 is not to be locked, the remote controller 53 returns to Step S802. In the case where the remote controller 53 is automatically put into the locked state, the order of the operation is irrelevant and the remote controller 53 may enter the locked state after the link is established.

When a wireless link to/from the television set 11 is established in Step S804, the remote controller 53 obtains in Step S805 an operating application from the television set 11 via wireless communication.

In Step S806, the remote controller 53 executes the operating application and displays a user interface screen for operation on the display section.

The user unlocks the remote controller 53 in Step S807, causing the remote controller 53 to enter the "unlocked state" and to disconnect the wireless link to/from the television set 11 simultaneously. The remote controller 53 then returns to Step S802.

In Step S808, the user inputs through the user interface screen an appliance operating instruction such as the specification of a channel or a volume adjustment. In Step S809, the remote controller 13 transmits to the television set 11 an operation command that reflects the specifics of the input appliance operating instruction.

After transmitting the operation command, the remote controller 53 returns to Step S807 and stands by until an appliance operating instruction or an operation of unlocking the remote controller 53 is received from the user.

As long as the remote controller 53 is in the "locked state", the directional antenna used is kept switched so that the wireless connection to/from the television set 11 is maintained. If the television set 11 exits the communication region of every one of the antennas 21*a* to 21*c* as a result of changing the direction of the remote controller while the wireless link to/from the television set 11 is established, the remote controller 53 automatically disconnects the wireless link and returns to Step S802. The remote controller 53 automatically enters the "unlocked state" at this point.

<Operation of the Remote Operation System>

Figure 10:
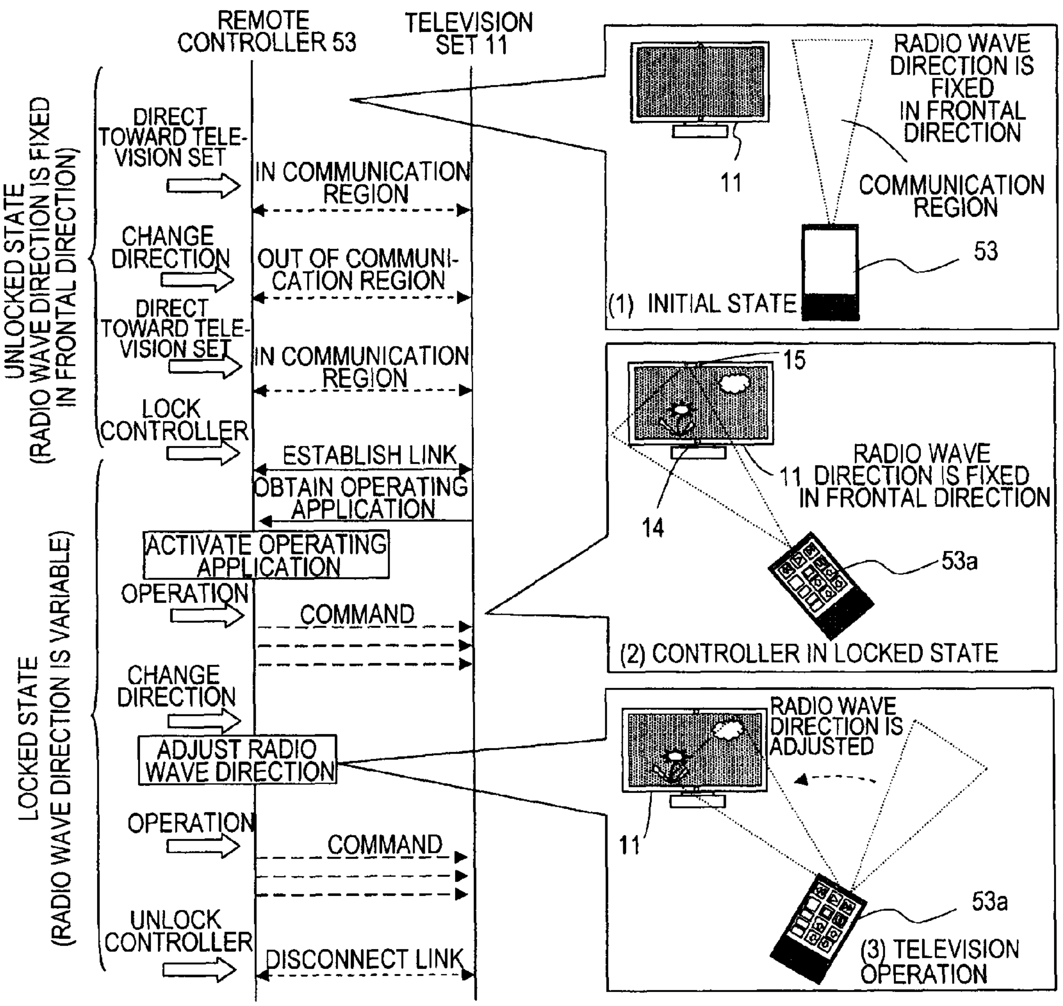
FIG. 10 is a diagram illustrating the flow of remote operation in the remote operation system according to the second embodiment of the present invention.

An example of the operation flow of the remote operation system illustrated in FIG. 7 is described with reference to FIG. 10.

When the user directs the remote controller 53 toward the television set 11 (more specifically, when the user directs the specific directional antenna 21*a* toward the television set 11), the remote controller 53 and the television set 11 enter the wireless communication region of each other. When the user locks the remote controller 53 in this state, a wireless link is established between the remote controller 53 and the television set 11. Once the wireless link is established, the alert section 15 outputs at least one of light and sound to inform the user of the fact of the establishment of the wireless link.

The remote controller 53 then obtains an operating application for remotely operating the television set 11 from the television set 11, and activates the operating application. This generates a user interface for remotely operating the television set 11 (a television set operating screen 53*a*) on the remote controller 53 and enables the user to remotely operate the television set 11 by the remote controller 53. When the user inputs an appliance operating instruction such as a channel instruction or a volume adjustment, the remote controller 13 transmits an operation command that reflects the specifics of the operating instruction to the television set 11. The television set 11 executes an operation dictated by the operation command.

When the user directs the remote controller 53 in another direction while the remote controller 53 is in the "locked state", causing the television set 11 to exit the wireless communication region of the directional antenna 21*a*, the remote controller 53 switches the directional antenna used as an adjustment that ensures the continued transmission of electric waves to the television set 11. This maintains the wireless link between the remote controller 53 and the television set 11, thus allowing the user to keep operating the television set 11 remotely.

When the user unlocks the remote controller 53, the remote controller 53 automatically disconnects the wireless link to/from the television set 11. The wireless link is automatically disconnected also when a given period of time elapses after the user stops holding the remote controller 53 in his/her hand by, for example, putting the remote controller 53 on a desk.

With the remote controller 53 operating as described above, the user can select an appliance (the television set 11) to be operated by directing the remote controller 53 toward the appliance and locking the remote controller 53, and can use the remote controller 53 as a remote controller for remotely operating the television set 11. Further, the electric wave transmission direction is automatically adjusted to a change in the direction of the remote controller 53, thereby allowing the user to keep operating the television set 11 remotely.

The directional antennas 21*a*, 21*b*, and 21*c* may all transmit electric waves during the locked state and, in this case, the switching of the directional antennas is unnecessary.

The television set 11, in addition to the remote controller 53, may have a plurality of directional antennas. When the directional antenna used in the television set 11 is switched as well, the wireless link between the remote controller 53 and the television set 11 is maintained more securely.

In the case where the direction of the remote controller in the unlocked state is changed, causing an appliance to be controlled that is not the television set 11, namely, the air conditioner 12, to enter the region of wireless communication that uses the specific directional antenna 21*a*, an operation similar to the above-mentioned operation for the television set 11 may be performed between the remote controller 53 and the air conditioner 12.

The remote controller 53 may be a terminal dedicated as a remote controller or may be a general-purpose mobile terminal such as a smartphone or a notebook computer. When the remote controller 53 is a general-purpose mobile terminal, the operation described above can be executed by installing in the mobile terminal a computer program that controls the mobile terminal to execute the above-mentioned remote operation for an appliance to be controlled. The computer program may be installed from a recording medium (an optical disc, a semiconductor memory, or the like) having the computer program recorded thereon, or may be downloaded via the Internet or other telecommunication lines.

Figure 11:
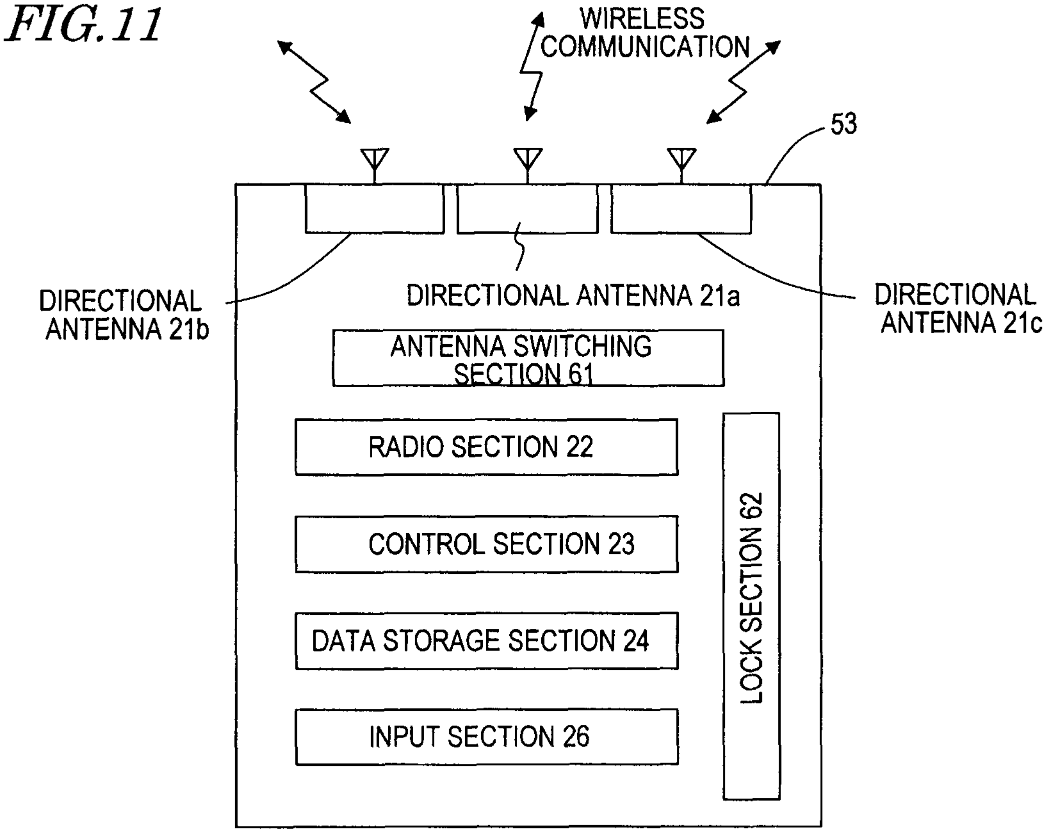
FIG. 11 is a diagram illustrating another example of the remote controller according to the second embodiment of the present invention.

Means for inputting an operating instruction by the user may be buttons or a keyboard instead of a touch panel. FIG. 11 illustrates as another example of the remote controller 53 a remote controller whose input section 26 is buttons or a keyboard. Through execution of the operating application, each of the buttons serving as the input section 26, or each key of the keyboard serving as the input section 26, is allocated an operation command (is set a user interface) for each appliance. The user presses one of the buttons or one of the keys of the keyboard, to thereby transmit an operation command that is associated with the button or the key to the relevant appliance to be controlled.

The remote controller 53, which has three directional antennas, may instead have two directional antennas or four or more directional antennas. In addition, while the directional antennas here respectively transmit electric waves in fixed directions and the directional antenna used is switched depending on the direction of the remote controller 53, the present invention is not limited thereto. A directional antenna capable of changing the direction in which electric waves are transmitted depending on the direction of the remote controller 53 may be used instead of the directional antennas 21*a* to 21*c* and the antenna switching section 61. Alternatively, a plurality of directional antennas capable of changing the electric wave transmission direction may be used to change at least one of the electric wave transmission direction and the directional antenna used depending on the direction of the remote controller 53. In short, any modifications can be made as long as the transmission direction of electric waves from the remote controller 53 is fixed while the remote controller 53 is in the "unlocked state" and can be changed suitably while the remote controller 53 is in the "locked state".

The remote controller 53, which obtains operating applications from the television set 11 here, may hold in advance operating applications for remotely operating the television set 11 and execute one of the operating applications that is associated with identification information received from the television set 11 as information for identifying the appliance type.

The wireless communication used in this embodiment is WiGig, but the present invention is not limited thereto and other directional wireless communication methods may be employed. Further, interactive communication may be performed through optical communication using laser light, for example.

For example, the present invention is applicable to a remote operation system or other such systems in which various appliances including AV equipment such as a television set and household appliances such as an air conditioner are remotely operated by one remote controller.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A remote operation system for remotely operating an appliance to be controlled by a controller through use of wireless communication capable of interactive communication and having directivity, the controller comprising:

a plurality of directional antennas which are directional in directions different from one another;

an antenna switching section for switching among the plurality of directional antennas to be used; and a lock section for selecting between a locked state and an unlocked state of the controller, wherein the remote operation system executes the following operations:

(c-i) when the controller is in the unlocked state, the antenna switching section selects a specific directional antenna from among the plurality of directional antennas;

(c-ii) when the controller is changed in direction in a manner that causes the appliance to be controlled to enter a region of wireless communication which uses the specific directional antenna, the lock section switches the controller from the unlocked state to the locked state, and the controller and the appliance to be controlled establish a wireless link to each other;

(c-iii) during the locked state, the antenna switching section sequentially switches among the plurality of directional antennas to be used, as the appliance to be controlled to and from which the wireless link has been established exits a wireless communication region of one directional antenna and enters a wireless communication region of another directional antenna;

(c-iv) the appliance to be controlled transmits, by the wireless communication, to the controller, data for remotely operating the appliance to be controlled by the controller;

(c-v) based on the data received from the appliance to be controlled, the controller sets a user interface for remotely operating the appliance to be controlled; and (c-vi) when switched from the locked state to the unlocked state, the controller disconnects the established wireless link.

2. The remote operation system according to claim 1, wherein, when the controller is operated by a user, the remote operation system executes the following operations:

(d-i) the controller transmits, by the wireless communication, to the appliance to be controlled, a command that indicates an instruction input by the user; and (d-ii) the appliance to be controlled executes an operation based on the received command.

3. The remote operation system according to claim 1, wherein, when the controller is changed in direction in a manner that causes the appliance to be controlled to exit regions of wireless communication to and from all of the plurality of directional antennas, the wireless link is disconnected automatically.

4. The remote operation system according to claim 1, wherein, during the unlocked state, when the controller is changed in direction in a manner that causes another appliance to be controlled, which is different from the appliance to be controlled from which the wireless link has been disconnected, to enter the region of wireless communication which uses the specific directional antenna, the operations (c-ii) to (c-vi) are executed between the controller and the another appliance to be controlled.

5. The remote operation system according to claim 1, wherein the controller further comprises a display section, and wherein, based on the data received from the appliance to be controlled, the controller builds a user interface screen on the display section.

6. The remote operation system according to claim 5, wherein the data comprises application software for operating the appliance to be controlled, and wherein the controller builds the user interface screen on the display section by executing the application software for operating the appliance to be controlled.

7. The remote operation system according to claim 5, wherein the controller includes, in advance, a piece of user interface screen information in association with each type of appliance to be controlled, wherein the data comprises identification information for discriminating one appliance to be controlled from another appliance to be controlled, and wherein the controller builds on the display section the user interface screen associated with the appliance to be controlled that has been identified from the identification information.

8. The remote operation system according to claim 1, comprising a directional antenna that is capable of changing an electric wave transmission direction, instead of the plurality of directional antennas and the antenna switching section, wherein, when the controller is in the unlocked state, the electric wave transmission direction of the directional antenna is fixed, and wherein, when the controller is in the locked state, the directional antenna changes the electric wave transmission direction as needed in a manner that causes the appliance to be controlled to and from which the wireless link has been established to enter a wireless communication region.

9. A controller for remotely operating an appliance to be controlled by a controller through use of wireless communication capable of interactive communication and having directivity, the controller comprising:

a plurality of directional antennas which are directional in directions different from one another;

an antenna switching section for switching among the plurality of directional antennas to be used; and a lock section for selecting between a locked state and an unlocked state of the controller, wherein the controller is configured to execute the following operations of:

(c-i) selecting, by the antenna switching section, when the controller is in the unlocked state, a specific directional antenna from among the plurality of directional antennas;

(c-ii) switching, by the lock section, when the controller is changed in direction in a manner that causes the appliance to be controlled to enter a region of wireless communication which uses the specific directional antenna, the controller from the unlocked state to the locked state, and establishing a wireless link between the controller and the appliance to be controlled;

(c-iii) sequentially switching, by the antenna switching section, during the locked state, among the plurality of directional antennas to be used, as the appliance to be controlled to and from which the wireless link has been established exits a wireless communication region of one directional antenna and enters a wireless communication region of another directional antenna;

(c-iv) receiving, by the wireless communication, from the appliance to be controlled, data for remotely operating the appliance to be controlled;

(c-v) setting, based on the data received from the appliance to be controlled, a user interface for remotely operating the appliance to be controlled; and (c-vi) disconnecting, by the controller, the established wireless link when the controller is switched from the locked state to the unlocked state.

10. A non-transitory computer-readable medium storing a program for causing a controller to execute remote operation with respect to an appliance to be controlled, which uses wireless communication capable of interactive communication and having directivity, the controller comprising a plurality of directional antennas which are directional in directions different from one another, the program controlling the controller to execute the steps of:

(c-i) when the controller is in an unlocked state, selecting a specific directional antenna from among the plurality of directional antennas;

(c-ii) when the controller is changed in direction in a manner that causes the appliance to be controlled to enter a region of wireless communication which uses the specific directional antenna, switching the controller from the unlocked state to a locked state, and establishing a wireless link between the controller and the appliance to be controlled;

(c-iii) during the locked state, sequentially switching among the plurality of directional antennas to be used, as the appliance to be controlled to and from which the wireless link has been established exits a wireless communication region of one directional antenna and enters a wireless communication region of another directional antenna;

(c-iv) receiving, by the wireless communication, from the appliance to be controlled, data for remotely operating the appliance to be controlled;

(c-v) based on the data received from the appliance to be controlled, setting a user interface for remotely operating the appliance to be controlled; and (c-vi) when the controller is switched from the locked state to the unlocked state, disconnecting the established wireless link.

* * * * *